Figure 3:
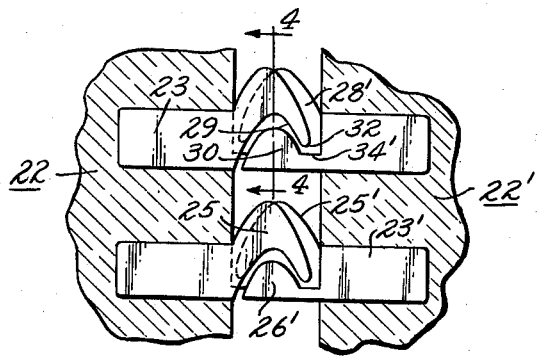

May 29, 1951  G. SUNDBACK  2,554,929
SLIDE FASTENER

Filed June 30, 1945  2 Sheets-Sheet 1

INVENTOR.
Gideon Sundback
BY J. L. Chisholm
ATTORNEY.

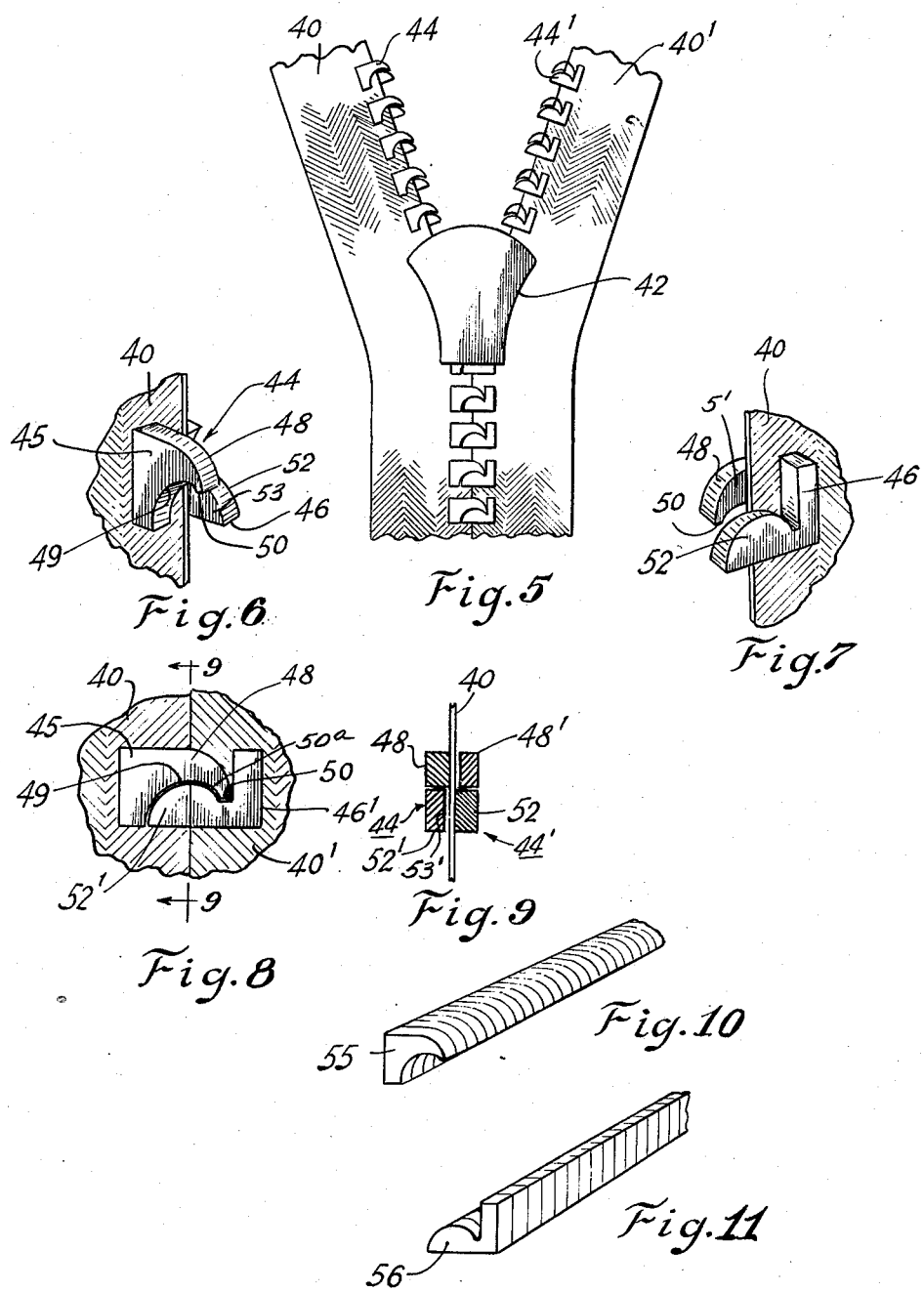

Patented May 29, 1951

2,554,929

UNITED STATES PATENT OFFICE 2,554,929

SLIDE FASTENER

Gideon Sundback, Meadville, Pa., assignor to Talon, Inc., Meadville, Pa., a corporation of Pennsylvania Application June 30, 1945, Serial No. 602,477

8 Claims. (Cl. 24—205.13)

This invention relates to slide fasteners or zippers having a pair of stringers, each having a row of interlocking elements which, by means of a slider, can be progressively interlocked to close the fastener, or progressively disengaged to open the fastener.

The usual form of zipper is of the staggered or interlacing type in which each element of one row lies between two adjacent elements of the opposite row when the zipper is closed, and thus interlocks with both. This requires accurate spacing of the elements in each row to hold between them the staggered elements of the opposite row. An example is shown in my Patent 1,219,881. Such zippers have many advantages. They are smooth in operation, and when the elements are engaged, they interlock positively and securely to provide an effective fastening or closure. However, the staggered interlocking action has disadvantages both in the manufacture and in the use of the fastener and imposes limitations on its usefulness. The fastener cannot be extended nor contracted. It cannot be extended because this would increase the spacing of the elements and cause the fastener to fall apart. It cannot be contracted because the elements of one stringer, interleaved with the elements of the other form a substantially solid column having negligible space for contraction. Thus the fastener is useless on articles which must be stretched or withstand severe tension in use, for example, many shoes, tents and elastic articles such as two-way stretch girdles.

These and other limitations have encouraged the design of fasteners in which each element interlocks solely with one opposite element, permitting variation of spacing between the interlocked pairs of elements without affecting the security of the interlocked relation and without affecting either the interlocking or disengaging action of the slider. A number of such opposite-interlocking fasteners have been proposed, but all of the proposed designs which have come to my attention have one or more of the following disadvantages; the requirement for right and left hand elements on the two stringers, insecurity of locking action on one hand or difficulty of locking or releasing on the other hand, and difficulty or impossibility of making the elements by economical mass production means.

The present invention seeks to remove these disadvantages by providing an improved fastener having both the advantages of staggered interlocking zippers as exemplified by my Patent 1,219,881 and the advantages of oppositely-interlocking zippers. Thus I provide a fastener having identical interlocking elements on both stringers, a fastener which is extensible and contractible, and one which can be economically made by simple and inexpensive apparatus.

Figure 4:
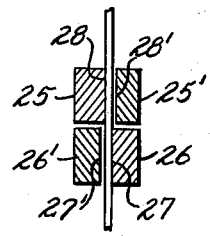
Figure 2:
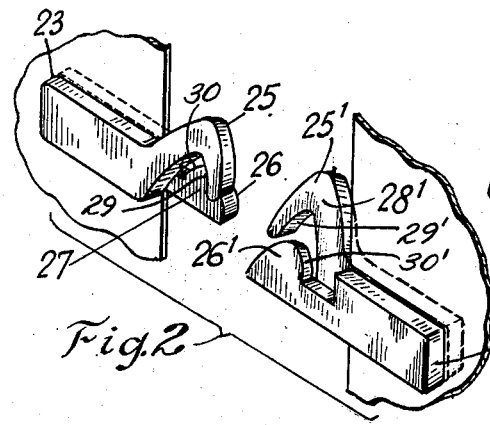
Figure 1:
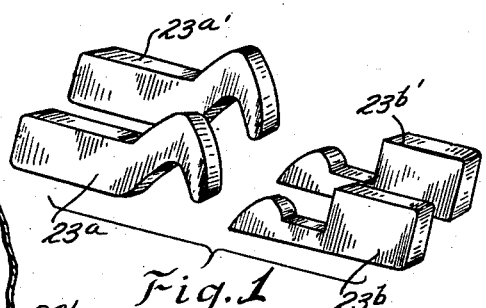

In the accompanying drawings:

Fig. 1 is a perspective of the parts forming a pair of interlocking elements;

Fig. 2 is a perspective view of a pair of completed fastener elements embodying the invention, Fig. 3 is a plan of a portion of an interlocked fastener embodying the elements shown in Fig. 2, Fig. 4 is a section on the line 4—4 of Fig. 3, Fig. 5 is a plan corresponding to Fig. 3 showing a preferred modified embodiment of the invention, Fig. 6 is an enlarged perspective view of the interlocking element as seen from the front of the left hand stringer in Fig. 5, Fig. 7 is a perspective view of the same element as seen from the back of the stringer, Fig. 8 is an enlarged plan of a pair of interlocked elements, as seen in Fig. 5, Fig. 9 is a section on the line 9—9 of Fig. 8 with the spacing exaggerated for clarity in illustration, Fig. 10 is a perspective view of a formed rod used to make one of the halves of an interlocking element, and Fig. 11 is a similar perspective view of another formed rod used to make the other half of the element.

The fastener consists of two identical stringers 22, 22' each having a series or row of identical interlocking elements 23, 23'. Each interlocking element is formed of dissimilar halves secured in register with each other on opposite faces of the tape, as by sticking, which includes any adhesion as adhesive cementing, softening and pressing into the fibers of the tape, die casting in place, and the like. Each element 23 consists of a front half 23a shown in Fig. 1 and a reversed back half 23b. Each element 23' consists of a front half 23b' and a reversed back half 23a'. When the elements are rotated into interlocked position, in the known manner, the hook 25 of interlocking element 23 engages the hump 26' and the hook 25' of interlocking element 23' engages the hump 26 of element 23. The surfaces 29 and 29' of the hooks 25 and 25' extend longitudinally of the fastener and engage behind the longitudinally extending surfaces 30' and 30 of the humps 26' and 26 respectively. This engagement of longitudinally extending surfaces prevents disengagement of the elements in the plane of the tapes in a direction across the length of the tapes. Likewise the elements cannot be disengaged by moving one of them along the length of the tapes, for as seen in Fig. 4 hook 25 prevents hump 26' (and element 23') from moving up, and hump 26 prevents hook 25' (and element 23') from moving down. Likewise the elements cannot be disengaged in the direction perpendicular to the plane of the tapes because side surface 27 of hump 26 of element 23 engages side surface 27' of hump 26' of element 23' and prevents element 23' from moving to the right as seen in Fig. 4, while side surface 28 of hook 25 of element 23 engages side surface 28' of hook 25' of element 23' and prevents element 23' from moving to the left as seen in Fig. 4. The side surfaces 27 and 28 are separated laterally of the element by the thickness of the tape and are separated longitudinally of the element in order to facilitate manufacture. If desired the entire element may be made in one piece, as by die-casting, and clamped or crimped to the tape in the customary manner. When this is done the longitudinal separation of these surfaces simplifies the molds by eliminating cores, since each element when viewed in some one direction is devoid of undercut or overhanging parts.

I prefer to embody the principles of construction herein set forth in the form shown in Figs. 5 to 11. In this modification the stringers are in the form of textile tapes 40 and 40' having identical series of interlocking elements 44 and 44' respectively, which can be interlocked or released by a conventional slider 42. While the complete interlocking elements are identical, each element 44 consists of two dissimilar halves 45 and 46 which are secured on opposite faces of the tape in register with each other.

Each element half 45 is a flat plate similar in form to a Greek letter gamma and includes a curved projection 48 corresponding to the hook 25 in Figs. 2 to 4 and having a curved lower surface 49. Each element half 46 is generally in the shape of a reversed L and includes a curved projecting hump 52 corresponding to the hump 26 in Figs. 2 to 4. When opposite elements are interlocked by rotating the curved surface 49 over the curved hump 52' the hooked end 50 drops behind the hump 52', the parts so far described prevent separation of the elements in the directions both of the length and of the width of the tapes, for the curved surface 49 functions as an end surface and engages the curved hump 52' to prevent the element 44 from moving down the same as the fastener seen in Fig. 2, while the surface 49' functions as an end surface and engages the hump 52 to prevent the element 44 from moving up. Likewise the hooked end 50 has a longitudinally extending surface 50a engaging the longitudinally extending part of the hump 52' prevents separation in the direction of the width as long as the elements 44 and 44' are held parallel.

When the elements are engaged the inside surface 51 of the curved projection 48 (corresponding to the surface 28 of hook 25 in Fig. 4) engages the side surface of the tape 40' opposite the projection 48' of element 44' (corresponding to the surface 28'), and the projection 48' of element 44' correspondingly engages the tape 40 of element 44 opposite its projection 48. Also the inside surface 53' of the hump 52' (corresponding to the surface 27' of hump 26') engages the tape 40 opposite the hump 52 and the hump 52 engages the tape 40' opposite the hump 52'. This prevents separation of the elements in the direction perpendicular to the plane of the tapes, since projections 48 and 48' cannot pass to permit the element 44 to drop below the plane of the tapes, and the humps 52 and 52' cannot pass to permit the element 44 to rise out of the plane of the tapes.

The element halves are preferably formed by slicing plates from shaped rods 55 and 56 as shown in Figs. 10 and 11 formed by extruding suitable synthetic plastic or resinous material through dies shaped to conform to the outlines of the halves. The halves are assembled to form complete elements by sticking on opposite faces of the tape in register. Preferably a soluble material is used, for example cellulose acetate, which can be softened by dipping in acetone. The sticking may be accomplished by wetting the tape with the solvent and pressing the element halves on the tape while it is wet. The solvent softens the faces of the halves, the solvent evaporates quickly and the elements stick to the tape with sufficient force to permit handling and subsequent processing. After the elements have been placed and the tape initially dried, the tape can be dipped in solvent just long enough to soften the surfaces of the elements and form a cement with the solvent. This cement flows into the fibers of the tape and the solvent is subsequently evaporated. This leaves a firm, integral mass including the element halves (which retain their form) and roots or filaments extending into the tape and anchoring the element securely to the tape.

One feature of the invention is the meeting of the two tapes 40 and 40' at their edges, leaving no gap between the tapes. This permits a larger area of each element half to be used for sticking to the tapes and thus increases the strength of the fastener. Also it is of advantage when making dust-sealing fasteners, for example for use in vacuum cleaner bags.

I claim as my invention:

1. A slide fastener comprising in combination a pair of stringers having identical series of identical interlocking elements, each element of one stringer being adapted to interlock with an oppositely positioned element on the other stringer independently of adjacent elements, each element having a pair of projecting flanges having side surfaces which are displaced longitudinally on the element and are adapted to overlie and engage corresponding longitudinally displaced side surfaces on the opposite element to prevent separation of the elements in the direction perpendicular to the plane of the stringers, each element also having a pair of end surfaces longitudinally displaced for engaging corresponding end surfaces of the opposite element to prevent separation of the elements in the direction of the length of the stringers and a longitudinal surface for engaging a corresponding longitudinal surface on the opposite element to prevent separation of the elements in the direction of the width of the stringers.

2. A slide fastener comprising in combination a pair of stringers having identical series of identical interlocking elements, each element of one stringer being adapted to interlock with an oppositely positioned element on the other stringer independently of adjacent elements each element having a pair of projecting flanges having side surfaces which are displaced both laterally and longitudinally on the element and are adapted to overlie and engage corresponding longitudinally displaced side surfaces on the opposite element to prevent separation of the elements in the direction perpendicular to the plane of the stringers, each element also having a pair of end surfaces longitudinally displaced for engaging corresponding end surfaces of the opposite element to prevent separation of the elements in the direction of the length of the stringers and a longitudinal surface for engaging a corresponding longitudinal surface on the opposite element to prevent separation of the elements in the direction of the width of the stringers.

3. A slide fastener comprising in combination a pair of stringers having identical series of identical interlocking elements, each element of one stringer being adapted to interlock with an oppositely positioned element on the other stringer independently of adjacent elements each element having a pair of projecting flanges having side surfaces which are displaced longitudinally on the element and are adapted to overlie and engage corresponding longitudinally displaced side surfaces on the opposite element to prevent separation of the elements in the direction perpendicular to the plane of the stringers, each element also having a pair of end surfaces longitudinally displaced for engaging corresponding end surfaces of the opposite element to prevent separation of the elements in the direction of the length of the stringers and a longitudinal surface for engaging a corresponding longitudinal surface on the opposite element to prevent separation of the elements in the direction of the width of the stringers, said elements being formed without undercut surfaces and adapted to be molded by two-part molds without cores.

4. A slide fastener comprising in combination a pair of stringers having identical series of identical interlocking elements, each element of one stringer being adapted to interlock with an oppositely positioned element on the other stringer independently of adjacent elements each element having a pair of projecting flanges having side surfaces which are displaced longitudinally on the element and are adapted to overlie and engage corresponding longitudinally displaced side surfaces on the opposite element to prevent separation of the elements in the direction perpendicular to the plane of the stringers, each element also having a pair of end surfaces longitudinally displaced for engaging corresponding end surfaces of the opposite element to prevent separation of the elements in the direction of the length of the stringers and a hook for engaging a corresponding shoulder on the opposite element to prevent separation of the elements in the direction of the width of the stringers.

5. A slide fastener comprising in combination a pair of stringers having identical series of identical interlocking elements, each element of one stringer being adapted to interlock with an oppositely positioned element on the other stringer independently of adjacent elements, each element having a pair of projecting flanges having side surfaces which are displaced longitudinally on the element with respect to the stringer and are adapted, when the elements are placed opposite and at an angle to one another, to overlie and engage corresponding longitudinally displaced side surfaces on the opposite element to prevent separation of the elements in the direction perpendicular to the plane of the stringers, each element also having a pair of end surfaces longitudinally displaced with respect to the stringer and adapted, when the elements are rotated toward each other to engage corresponding end surfaces of the opposite element to prevent separation of the elements in the direction of the length of the stringers, and a hook adapted on completion of such rotation to engage a corresponding shoulder on the opposite element to prevent separation of the elements in the direction of the width of the stringers.

6. A slide fastener comprising in combination a pair of stringers having identical series of identical interlocking elements, each element of one stringer being adapted to interlock with an oppositely positioned element on the other stringer independently of adjacent elements, each element having a pair of projecting flanges having side surfaces which are displaced longitudinally on the element with respect to the stringer and are adapted, when the elements are placed opposite and at an angle to one another, to overlie and engage corresponding longitudinally displaced side surfaces on the opposite element to prevent separation of the elements in the direction perpendicular to the plane of the stringers, each element also having a pair of end surfaces longitudinally displaced with respect to the stringer, and adapted, when the elements are rotated toward each other to engage corresponding end surfaces of the opposite element to prevent separation of the elements in the direction of the length of the stringers, and a hook adapted on completion of such rotation to engage a corresponding shoulder on the opposite element to prevent separation of the elements in the direction of the width of the stringers, said side surfaces being adapted, during rotation of the elements, to guide the hook to engage the shoulder.

7. A slide fastener comprising in combination a pair of stringers having identical series of identical interlocking elements, each element of one stringer being adapted to interlock with an oppositely positioned element on the other stringer independently of adjacent elements, each element having a pair of projecting flanges having side surfaces which are displaced longitudinally on the element and are adapted to overlie and engage corresponding longitudinally displaced side surfaces on the opposite element to prevent separation of the elements in the direction perpendicular to the plane of the stringers, one of said flanges also having a pair of end surfaces longitudinally displaced for engaging corresponding end surfaces of the opposite element to prevent separation of the elements in the direction of the length of the stringers and a hook for engaging a corresponding shoulder on the opposite element to prevent separation of the elements in the direction of the width of the stringers.

8. A slide fastener comprising in combination a pair of flexible tapes having identical series of interlocking elements secured to the tapes, each element of one tape being adapted to interlock with an oppositely positioned element on the other tape independently of adjacent elements, each element being constituted by two dissimilar halves secured to opposite faces of the tape, and having a pair of projecting flanges provided with side surfaces which are displaced longitudinally on the element and are adapted to overlie and engage corresponding longitudinally displaced side surfaces on the opposite element to prevent separation of the elements in the direction perpendicular to the plane of the tapes, each element also having a pair of end surfaces longitudinally displaced for engaging corresponding end surfaces of the opposite element to prevent separation of the elements in the direction of the length of the stringers and a hook for engaging a corresponding shoulder on the opposite element to prevent separation of the elements in the direction of the width of the stringers.

GIDEON SUNDBACK.

REFERENCES CITED

The following references are of record in the file of this patent:

UNITED STATES PATENTS

| Number | Name | Date |
|---|---|---|
| 1,817,838 | Poux | Aug. 4, 1931 |
| 1,918,721 | Sundback | July 18, 1933 |
| 2,091,617 | Sundback | Aug. 31, 1937 |

FOREIGN PATENTS

| Number | Country | Date |
|---|---|---|
| 721,568 | France | of 1932 |
| 591,209 | Germany | Jan. 18, 1934 |